Feb. 7, 1967    R. D. BOONE    3,302,656
METHOD AND MEANS FOR MOVING AN IRRIGATION SYSTEM
Filed Sept. 23, 1964    4 Sheets-Sheet 4
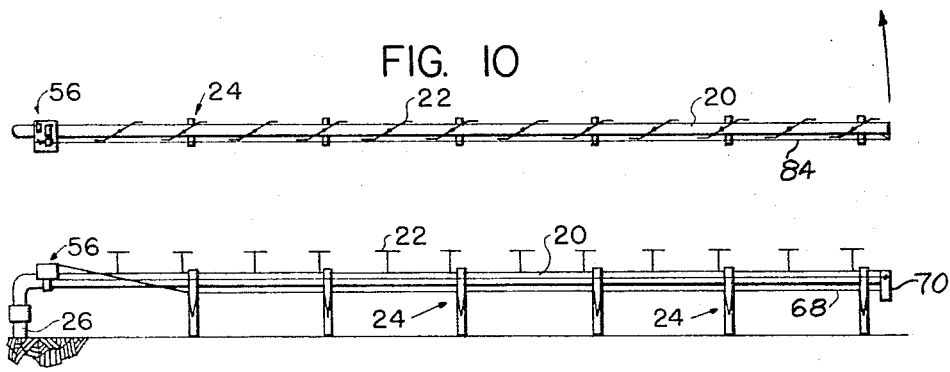
FIG. 10
FIG. 11
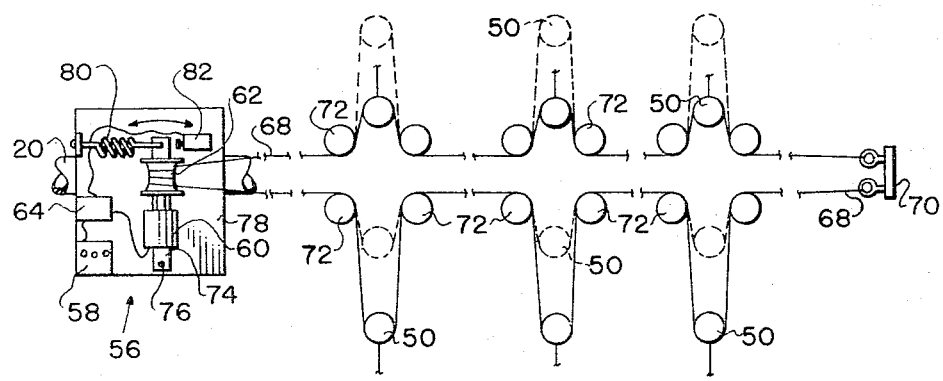
FIG. 6
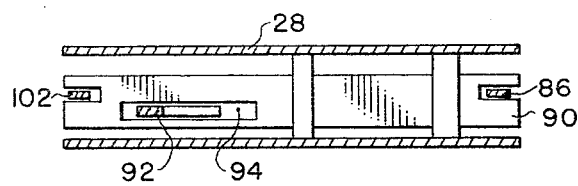
FIG. 5
RALPH D. BOONE
INVENTOR.
BY *C. W. Koffee*
Atty.

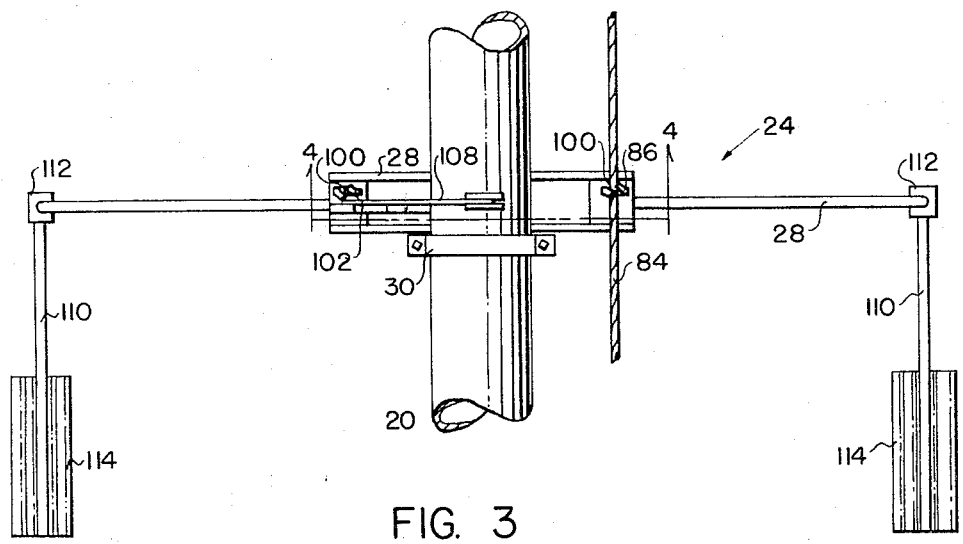
FIG. 3
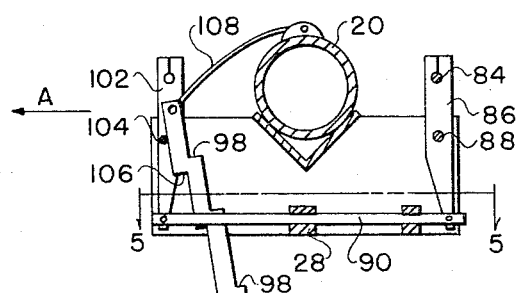
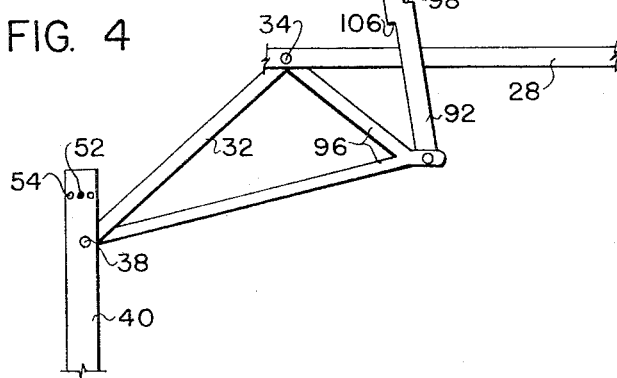
FIG. 4
RALPH D. BOONE
INVENTOR.

United States Patent Office 3,302,656
Patented Feb. 7, 1967

3,302,656
METHOD AND MEANS FOR MOVING AN
IRRIGATION SYSTEM
Ralph D. Boone, 2920 Axtell, Clovis, N. Mex. 88101
Filed Sept. 23, 1964, Ser. No. 398,647
10 Claims. (Cl. 137—1)

Under Rule 78, reference is made to my prior patent application filed September 27, 1963, Serial No. 312,109, now Patent No. 3,268,174, issued August 23, 1966, of which this application is a continuation-in-part.

This invention relates to agricultural irrigation systems and more particularly to a device for moving sprinkler pipe.

Many acres of farmland in the United States are presently irrigated by sprinkler irrigation systems. The moving of the pipe carrying the sprinklers has undergone extensive development. However, extensive development is still going on improving these systems. This application deals with improvement primarily in the area of a system which has power transmitted from a central located motor on the system to each of the several vehicles which support the pipe by means of a reciprocating cable. Although moving the individual vehicles by a reciprocating cable in itself is not new, difficulty is experienced in this type of moving system because of the extreme high tension necessary to apply to the cable to move the many vehicles. Previous systems have operated by moving the cable a relatively short amount with large tensions to transmit the power. This invention and application deals with a system where the cable is moved through a great amount of travel at low tension.

Another area of continuing development is that of maintaining alignment and more particularly to detecting misalignment. It will be understood that these systems are often over a thousand feet in length and have over twenty vehicles supporting the pipe. Therefore in muddy conditions it is possible for one vehicle to lose traction and slip and therefore the vehicles to become misaligned. To maintain them in line the first step is to detect misalignment and then apply correction. This application deals with an improved means of detecting misalignment. Prior workers in the field have primarily dealt with bending of the pipe either through its natural resilience or through flexible joints and detecting misalignment by the bend in the pipe between vehicles. Essentially the system described in this application includes stretching an alignment cable from one end of the pipe to the other and using this cable somewhat similar to a chalk line and bringing each vehicle into alignment with this cable extending the length of the pipe.

The particular type of vehicles used to move the pipe disclosed in both this application and my prior application noted above could be characterized as a step mover. I.e. a foot is placed against the ground, the frame is raised, the frame is moved forward, then the foot retracted, and the frame placed again against the ground. With this type of move, difficulty has been experienced with the frame either sinking into the ground due to the weight of the water in the pipe where it is irrigating. If a large ground engaging element is placed upon the bottom of the frame, it tends to form a suction with the mud so as it is difficult to raise up in the initial portion of the step. This application discloses a solution to this problem which is to place a corrugated element on the bottom of the frame.

An object of this invention is to move an agricultural sprinkler irrigation pipe to different positions within a field.

Another object of this invention is to provide mechanism for such a move whereby the power is transmitted by reciprocating cables which carry low tension.

Another object of this invention is to provide such a system which may be reversed to travel in the opposite direction or which may be towed in either direction aligned with the pipe.

Another object is to provide an improved means for maintaining the system in alignment.

Yet another object is to provide an improved means for detecting misalignment so that it might be corrected.

A further object is to provide an improved mechanism for aligning the vehicles once the misalignment has been detected.

A further object is to provide means for readily releasing a broad foot of a frame from mud in moving vehicles of a system.

A still further object is to provide a power mechanism for such a system which automatically prevents excessive tension from developing in the cable.

Still further objects are to achieve the above with a device that is sturdy, compact, durable, simple, versatile and reliable, yet inexpensive and easy to manufacture and operate.

Still further objects are to achieve the above with a method that is rapid, inexpensive, and does not require skilled people to operate.

The specific nature of the invention as well as other objects, uses and advantages thereof will clearly appear from the following description and from the accompanying drawing, the different views of which are not necessarily to the same scale, in which:

FIG. 3 is a plan view of one vehicle with the pipe and cables broken away showing the vehicle in a position being towed endwise, with some elements eliminated for clarity.

FIG. 4 is a partial sectional view taken on line 4—4 of FIG. 3 showing details of the alignment system.

FIG. 5 is a sectional view taken on line 5—5 of FIG. 4 showing details of a portion of the alignment mechanism.

FIG. 6 is a schematic representation of the power cable system.

FIG. 7 is a sectional view taken on line 7—7 of FIG. 2 showing a portion of the power cable arrangement on one vehicle.

FIG. 8 is a bottom view of the vehicle as would be seen from line 8—8 of FIG. 1.

FIG. 9 is a sectional view of the lower portion of the vehicle as taken on line 9—9 of FIG. 2.

FIG. 10 is a plan view schematic representing a system according to this invention.

FIG. 11 is an elevational view, schematically representing the system shown in FIG. 10.

Referring to FIGS. 10 and 11, there is schematically represented elongated pipe 20 adapted to carry water under pressure and adapted to carry a plurality of sprinklers 22. The elongated pipe 20 is supported by a plurality of vehicles 24. The pipe is supplied by a source of water under pressure in the form of vertical standpipe 26 and the standpipe 26 forms a center about which the pipe 20 rotates.

Figure 1:
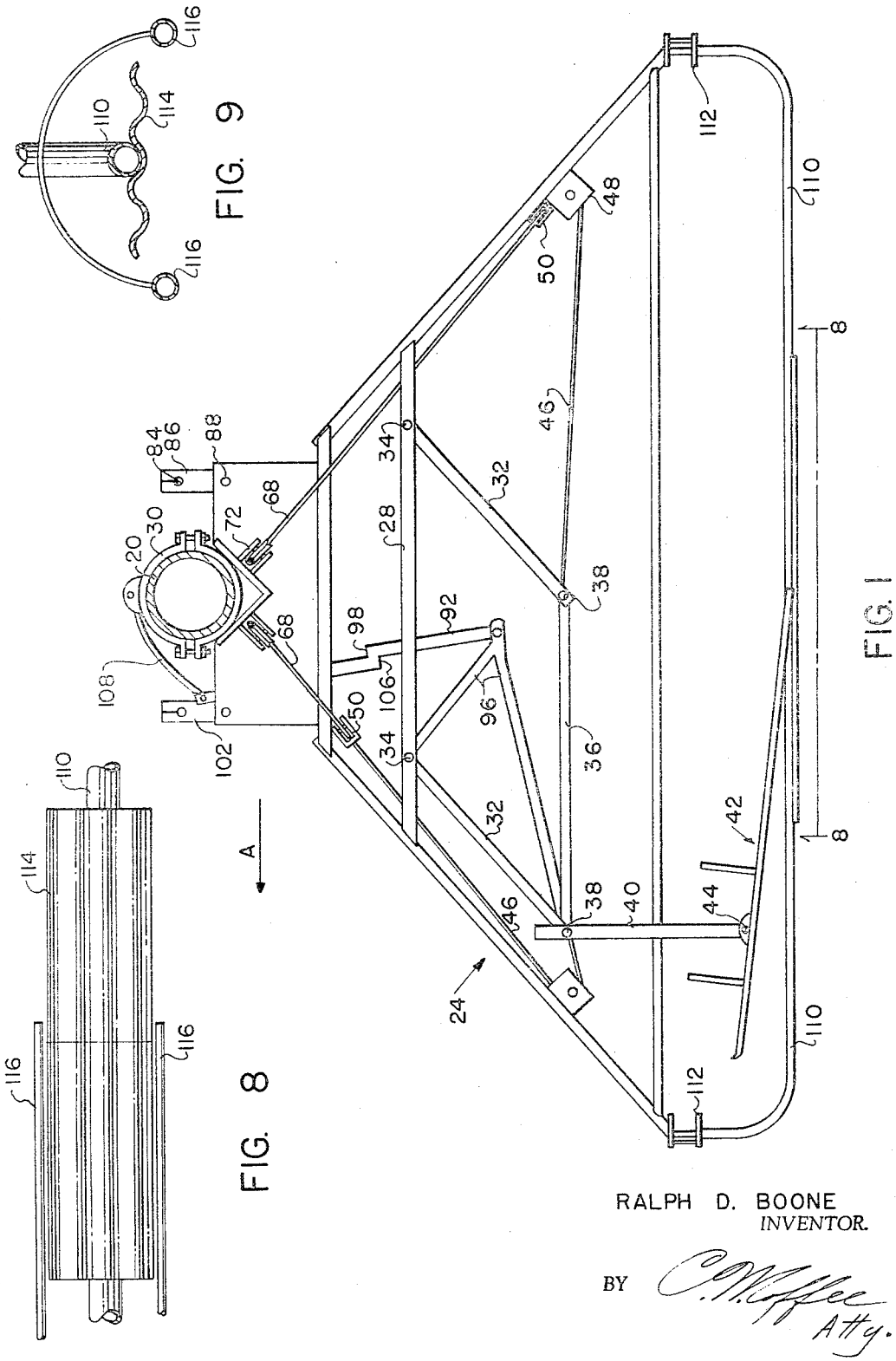
FIG. 1 is a side elevational view of one vehicle with the pipe and cables shown in section with the foot in the raised or relaxed position.
Figure 2:
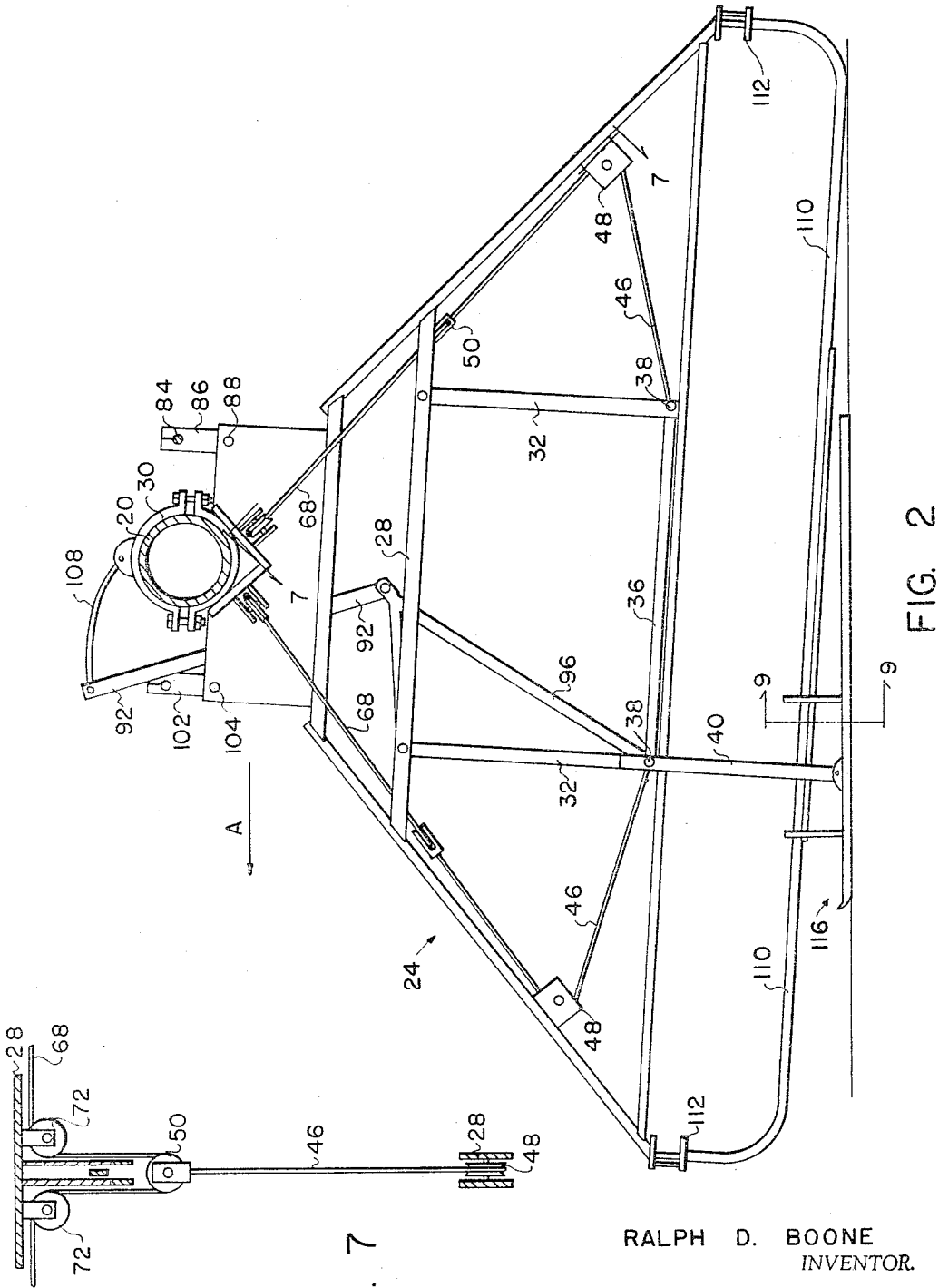
FIG. 2 is a side elevational view of one vehicle similar to FIG. 1 with the foot in the lower position and the vehicle in a moving position.

Referring to FIGS. 1 and 2 which show the vehicles 24 in greater detail, each vehicle has clamp 30 at the top of frame 28 which securely attaches the pipe 20 to the frame 28 and thus to the vehicle 24. The frame 28 extends to the forward and rear of the pipe 20 therefore it may be said that each of the vehicles is aligned transversely of the pipe. Inasmuch as all of the vehicles 24 are basically identical, one will be described in the singular and it will be understood that all the vehicles basically are the same.

Two legs 32 are pivoted at pivots 34 to the frame 28. Hobble 36 connects the lower portion of the two legs 32 and is pivoted to each of the lower legs 32 by knee pins 38. The hobble 36 is a tension element which connects the two legs 32. The length of the hobble 36 is the same as the length between the two pivots 34 so that the two legs 32 are parallel in all positions. Shank 40 is pivoted near its upper end to one of the knee pins 38. The shank 40 is readily removable from one knee pin 38 to be attached to the other knee pin 38 to reverse the direction of travel of the vehicle as will be more fully explained later. Foot 42 is pivoted at the bottom of the shank 40 by ankle pin 44. Knee cable 46 is a powered element and is attached to each knee pin 38 and reeved around knee pulley 48 which is attached to the frame 28 and attached to traveling pulley 50.

My previous filed patent applicaton, referred to above, will give a complete explanation of the operation. It may be seen that the reciprocation of the knee cables 46 (as will be more fully explained later) will cause the vehicle 24 to step forward with a step closely approximating that of the human leg. I.e. referring particularly to FIG. 1, it may be seen that the knee at the pin 38 is bent and that the foot 42 is in a raised position. The forward portion of the machine is referred to as that portion to which it is presently moving which is indicated by the arrow A in FIGS. 1 and 2. The other end of the vehicle 24 is referred to as the rear of the vehicle. Therefore if the rear knee cable 46 is tensioned both of the legs 32 are rotated to a more nearly vertical position by action of the hobble 36. This initial rotation causes the forward portion of the vehicle 24 to be lifted off the ground (FIG. 2). Continued pulling on the knee cable 46 will cause the vehicle 24 to be moved forward inasmuch as the knee cannot bend past the approximate straight position. The shank 40 is provided with stop 52 which may be positioned in a plurality of holes 54. This stop 52 permits the knee to be bent or broken only in one direction. In this regard the knee may be likened unto a toggle. The stop 52 may be placed in a selected one of the holes 54 to select the particular action of the knee as might be suited for different soil conditions depending upon how muddy it becomes upon the watering operation.

A central power unit 56 is attached to the pipe 20 at a convenient location, for example adjacent the standpipe 26. The power unit 56 includes electrical storage battery 58, electric motor 60, windlass drum 62, and time control device 64. Power cable 68 extends along the pipe 20 and is turned two or three times around the windlass drum 62 and extends along the pipe 20 to anchor 70.

Each vehicle (FIGS. 6 and 7) has four stationary pulleys 72 and two traveling pulleys 50. The power cable 68 is reeved around one of the stationary pulleys 72, the traveling pulley 50 and around another stationary pulley 72 and onto the next vehicle. At the next vehicle the power cable 68 is again reeved around one of the stationary pulleys 72, the traveling pulley 50, and another stationary pulley 72 and onto the next vehicle until it extends to the full length of the system from whence it is attached to the anchor 70 and back on the other side in the same fashion. The anchor 70 is attached to the opposite end of pipe 20 from standpipe 26. When the windlass drum 62 is rotated in a power direction it reels in the rear power cable 68 (FIGS. 1 and 2). As the rear power cable 68 is reeled in the traveling pulley 50 moves upward and toward the two stationary pulleys 72, thus moving the hobble 36 causing the vehicle 24 to take the forward power step. Also it will be seen that the vehicles 24 move one at a time, i.e. the vehicle closest to the power unit 56 will move first because of the friction of the pulleys. As the tension in the cable 68 increases the force on the first traveling pulley 50 will be greater than the force on the second traveling pulley 50 because of the friction of the cable passing around the pulleys. Therefore the first vehicle 24 goes through its power cycle before the second vehicle starts. Regardless of whether the vehicles move one at a time or all together the tension on the power cable 68 is only one half as much as the tension upon the knee cable 46 of any one vehicle. Therefore there is no large amount of tension upon the power cable 68. This is important because in an extremely long line of vehicles 24 a high amount of tension in the power cable 68 will tend to bow the pipe 20.

When I used the term "cable," both for the power cable 68 and the alignment cable 84, it will be understood that the term "cable" is being used in its broadest sense to mean a flexible tension element and a small aircraft control cable of only a fraction of an inch in diameter is used.

Further describing the power cycle, when the cable 68 is pulled in upon the rear side to make the power stroke, an equal amount of cable is paid out on the front side of each vehicle 24 permitting the forward traveling pulley 50 to move downward and therefore the hobble 36 is not blocked from its rearward movement.

The windlass drum 62 and motor 60 are mounted upon pivoted lever 74 which is pivoted at 76 to housing 78 of the power unit 56. Spring 80 is attached to the end of the lever 74 near the windlass drum 62 to the housing 78 so that it tensions the cable 68. Limit switch 82 is mounted upon the housing 78 so that when the tension of the cable 68 overcomes the bias of the spring 80, the lever 74 strikes limit switch 82.

The time control device 64 is such that at the end of a given interval of time it energizes the motor 60 to rotate the drum 62, to pull in the rear power cable 68 and pay out the forward power cable 68 to cause the vehicles 24 to go through a forward moving power step. When all traveling pulleys 50 have been moved to the full extent possible, the continued rotation of the windlass drum 62 causes an increased tension on the cable 68 and moves the lever 74 against the limit switch 82. The first time this occurs the time control device 64 reverses the direction of rotation of the motor 60. This causes the forward power cable 68 to be pulled in and the rear power cable 68 to be paid out, thus returning all the vehicles to the original position as shown in FIG. 1 ready for the next step. After all of the cable 68 has been pulled in until the tension in the cable is such that the lever 74 again strikes the limit switch 82, the time control device 64 then disconnects the power from battery 58 to the motor 60, completing a cycle. When the time interval again elapses the vehicles 24 again repeat a power stroke. When the battery 58 is disconnected from the motor 60 the tension on the cable 68 working through the windlass drum 62 will be sufficient to reverse the motor sufficiently so the lever 74 moves away from the limit switch 82 for proper operation. The anchor 70 could incorporate a spring to permit a limited movement of the cable 68 at the end of the line to allow for thermal expansion due to the heat on the cable 68 or the cold water running through the pipe 20 changing the lengths of these elements.

To reverse the direction of movement of all the vehicles 24 two things are necessary. First, all of the shanks 40 are removed from one knee pin 38 and attached to the other knee pin 38 with the foot 42 pointing in the direction which the vehicle 24 will travel.

It will be noted that the attachment of the shank 40 and the foot 42 is always forward of the center of gravity of the vehicle 24. Second, the power cable 68 is reversed around the windless drum 62. A cable splice (not shown) on the power cable 68 permits this reversal of direction around the windless drum 62 for the purpose of reversing the direction and therefore it is unnecessary to make any changes in the time control device 64 inasmuch as winding the cable 68 in the opposite direction around the drum 62 will accomplish this purpose.

As discussed previously, alignment of an irrigation pipe moving system is a problem, particularly for a system designed to move in a circle as shown in FIGS. 10 and 11. (In this regard it will be understood that the system could move in a straight line, however, inasmuch as a circle move is more difficult to maintain alignment, it has been illustrated as moving in a circle).

The principle by which the alignment is maintained is that misalignment is detected and then corrected. The misalignment is corrected only if a vehicle 24 gets ahead of the general line of vehicles. If a vehicle falls behind the general line of vehicles, no corrective measures are taken and the vehicle is permitted to take the full power step forward at each power stroke.

If a vehicle 24 gets ahead of the other vehicles, corrective measures are taken to either restrict its forward stroke to a partial step or no step at all.

Before any corrective measures can be taken it is necessary to detect misalignment.

Misalignment is detected by alignment cable 84 which is stretched from one end of the system to the other behind the pipe 20. It is placed behind the pipe 20 so that it will not be snagged by growing crops as the system moves forward. The alignment cable 84 is primarily independent of the pipe 20 and the irrigation system as a whole except for being attached securely at each end in tension.

Alignment lever 86 is a movable element or misalignment detection device on each vehicle 24 contacting the alignment cable at each vehicle.

Since the lever 86 is movable, it does not change the straight line established by the cable 84.

Each of the vehicles is brought into line to the cable 84.

The alignment lever 86 is pivoted at 88 to the frame 28 of each vehicle (FIGS. 4 and 5).

Horizontal lock bar 90 is pivoted at the bottom of lever 86 and is mounted for horizontal reciprocation within the frame 28. Crooked bar 92 extends through slot 94 in the lock bar 90. The bottom of the crooked bar 92 is pivoted to stiff leg 96 which is attached to the forward leg 32.

The stiff leg 96 extends to the rear of the leg 32. As the mechanism goes through the power stroke the stiff leg 96 moves the crooked bar 92 upward. If the crooked bar is locked so that it may not move upward, the mechanism cannot go through the power stroke and the traveling pulley 50 is blocked just as surely as if it had completed a power stroke.

If a vehicle 24 is ahead of its alignment, the alignment lever 86 will be located with its top to the rear as seen in FIG. 4. This will slide the lock bar 90 forward so that one of the several upper shoulders 98 upon the crooked bar 92 will strike the edge of the slot 94. This prevents the vehicle 24 from moving through its forward power moving step. Three upper shoulders 98 are provided so that the forward step may be partially prevented or completely prevented depending upon the amount of misalignment of the particular vehicle. If it is considerably misaligned it will take no step but if it is only partially misaligned it will take a partial step.

When the vehicle 24 is rigged for movement in the reverse direction from that indicated by the arrow A, the alignment cable 84 is moved from the forked slot 100 in the top of alignment lever 86 to the forked slot 100 in alignment lever 102. The alignment lever 102 is pivoted at 104 to the frame 28. The bottom of the alignment lever 102 is attached to the lock bar 90. Therefore if the vehicle 24 is moving in a direction opposite arrow A and some vehicle gets ahead of alignment the top of alignment lever 102 will be rotated in the direction of arrow A throwing the lock bar 90 in the direction of the system at that time. Therefore bottom shoulder 106 of crooked bar 92 will contact the edge of the slot 94 preventing the mechanism from going through a full power stroke. The top of the crooked bar 92 is guided by link 108 which is pivoted at one end to the top of the crooked bar 92 and the other to the frame 28 at the clamp 30.

Thus it may be seen that I have provided vehicles 24 which may be moved in the first direction and readily maintained in alignment and then readily reversed and run in the opposite direction and maintained in alignment.

FIG. 3 represents the vehicle 24 moving in an endwise direction, a direction aligned with the pipe 20. The lower portion of the frame 28 is in the form of runners 110 (FIGS. 1, 2 and 3). These runners are swivelled by pins in sockets 112 at each end of the frame 28. In normal operation the two runners 110 are pinned together at their center as in the position as seen in FIGS. 1 and 2. However, to move endwise, the pins are released so each of the runners 110 are free to swing about the sockets 112 to a position wherein they are aligned with the pipe 20. At such time a draft vehicle (not shown) such as a farm tractor may be attached to one end of the system and the pipe 20 disconnected from the pipe 26 and the pipe skidded to a new location. Guy wires (not shown) are attached from the pipe 20 to the frame 28 in such a move and may be a permanent installation in the system.

The lower part or ground engaging element of the frame 28 has corrugated plates 114 which are attached to the bottom of the runners 110 (FIGS. 3, 8 and 9). I have found that these corrugated plates 114 constructed of ordinary corrugated sheet metal roofing, are ideally suited for this purpose. They form sufficient width to prevent the frame 28 from sinking within the mud. However, the corrugated, undulating shape prevents them from sucking the mud when the vehicle 24 is raised in the step move. A flat ground engaging element forms a suction between itself and the mud so that it is difficult to raise the frame on the first portion of the step move. This difficulty in raising causes the foot 42 to sink into the mud rather than staying on top of the mud and moving it forward. The problem is particularly aggravated inasmuch as the sprinklers 22 cause a certain amount of vibration which causes the vehicles 24 to settle into the mud. I have found that the two tubular elements, toes 116, which are the ground engaging elements of the foot 42 are sufficient to maintain it above the ground.

It will be apparent that the embodiment shown is only exemplary and that various modifications can be made in construction, materials, and arrangement within the scope of the invention as defined in the appended claims.

I claim as my invention:

1. In an agricultural irrigation system having
   (a) an elongated pipe adapted to carry a plurality of sprinklers and adapted to carry water under pressure,
   (b) a plurality of vehicles movingly supporting said pipe,
   (c) a reciprocating powered element on each vehicle,
   (d) means on each vehicle for moving the vehicle and thus the pipe responsive to reciprocation of the powered element,
   (e) at least one power cable extending along the pipe to each vehicle, and
   (f) means attached to the power cable for reciprocating that power cable;

the improved structure for reciprocating each of the powered elements responsive to reciprocation of the power cable comprising:
   (g) two stationary pulleys mounted on each vehicle,
   (h) a traveling pulley attached to each powered element, and
   (j) said power cable reeved around one of the stationary pulleys then around the traveling pulley and then around the other of the stationary pulleys.

2. In an agricultural irrigation system having
   (a) an elongated pipe adapted to carry a plurality of sprinklers and adapted to carry water under pressure, (b) a plurality of vehicles movingly supporting said pipe, (c) a reciprocating powered element on each vehicle, (d) means on each vehicle for moving the vehicle and thus the pipe responsive to reciprocation of the powered element, (e) at least one power cable extending along the pipe to each vehicle, and (f) means attached to the power cable for reciprocating the power cable;

the improved structure for reciprocating each of the powered elements responsive to reciprocation of the power cable comprising:

(g) two stationary pulleys mounted on each vehicle, (h) a traveling pulley attached to each powered element, (j) said power cable reeved around one of the stationary pulleys then around the traveling pulley and then around the other of the stationary pulleys, (k) means on each vehicle for detecting if it is ahead of the line of vehicles, and (m) lock means on each vehicle for restricting the movement of the power element responsive to detection of the means for detecting that the vehicle is ahead of the line of vehicles.

3. The invention as defined in claim 2 wherein the means for detecting includes (n) an alignment cable extending along the pipe, (p) a movable alignment element on each vehicle connected to said alignment cable, and (q) said lock means is responsive to the position of said movable alignment element.

4. The invention as defined in claim 2 wherein the means for reciprocating the power cable includes (n) means for pulling the power cable until a predetermined tension is obtained.

5. The invention as defined in claim 4 wherein the means for pulling includes (o) a windlass drum (p) mounted for movement on the pipe, (q) the power cable wound on the drum (r) means biasing the drum to tension the power cable, (s) a motor for rotating the drum, and (t) means for inactivating the motor when a predetermined tension is obtained on the power cable.

6. In an agricultural irrigation system having (a) an elongated pipe adapted to carry a plurality of sprinklers and adapted to carry water under pressure, (b) a plurality of vehicles movingly supporting said pipe, and (c) means connected to each vehicle for moving said vehicle and said pipe;

the improved means for detecting misalignment of the vehicles comprising:

(d) an alignment cable extending along the pipe, (e) said alignment cable attached at each end of the cable to the extreme ends of the pipe, and (f) means on each vehicle connected to said alignment cable for detecting if the vehicle is in alignment as determined by said alignment cable.

7. In an agricultural irrigation system having (a) an elongated pipe adapted to carry a plurality of sprinklers and adapted to carry water under pressure, (b) a plurality of vehicles movingly supporting said pipe, (c) means connected to each vehicle for powering said vehicle for moving same, thus moving said pipe;

the improved method for detecting misalignment of the vehicles comprising:

(d) stretching a line from one end of the system to the other, and (e) detecting the alignment at each vehicle relative to the stretched line.

8. In an agricultural irrigation system having (a) an elongated pipe adapted to carry a plurality of sprinklers and adapted to carry water under pressure, (b) a plurality of vehicles movingly supporting said pipe, (c) means connected to each vehicle for powering said vehicle for moving same, thus moving said pipe;

the method of maintaining alignment of the vehicles comprising:

(d) establishing a straight line carried by the pipe at the ends of the pipe but independent of the pipe therebetween and (e) aligning each vehicle with said established line.

9. In an agricultural irrigation system having (a) an elongated pipe adapted to carry a plurality of sprinklers and adapted to carry water under pressure, (b) a plurality of vehicles movingly supporting said pipe, (c) a source of power connected to the system, and (d) means connecting the source of power to each of the vehicles for transmitting power for the source of power to the vehicles for moving same;

the improved means for maintaining alignment of the vehicles comprising:

(e) an alignment cable extending along the pipe, (f) a movable alignment element on each vehicle connected to said alignment cable, and (g) means on each vehicle for controlling the transmission of power from the means for transmitting to the vehicle responsive to the position of said movable element.

10. The invention as defined in claim 9 wherein (h) said means for transmitting is by pulses of power, and (j) said means for controlling at least partially prevents said pulses from being transmitted to said vehicles.

References Cited by the Examiner

UNITED STATES PATENTS

| | | | |
|---|---|---|---|
| 466,187 | 12/1891 | Sauer | 239—199 |
| 1,511,960 | 10/1924 | Goldschmidt | 180—8 |
| 3,001,721 | 9/1961 | Zybach | 239—177 |

FOREIGN PATENTS

| | | |
|---|---|---|
| 15,514 | 5/1912 | France. |

M. CARY NELSON, *Primary Examiner.*

H. T. KLINKSIEK, *Assistant Examiner.*